June 7, 1938.  C. L. EKSERGIAN  2,119,669
VEHICLE WHEEL
Filed April 17, 1931
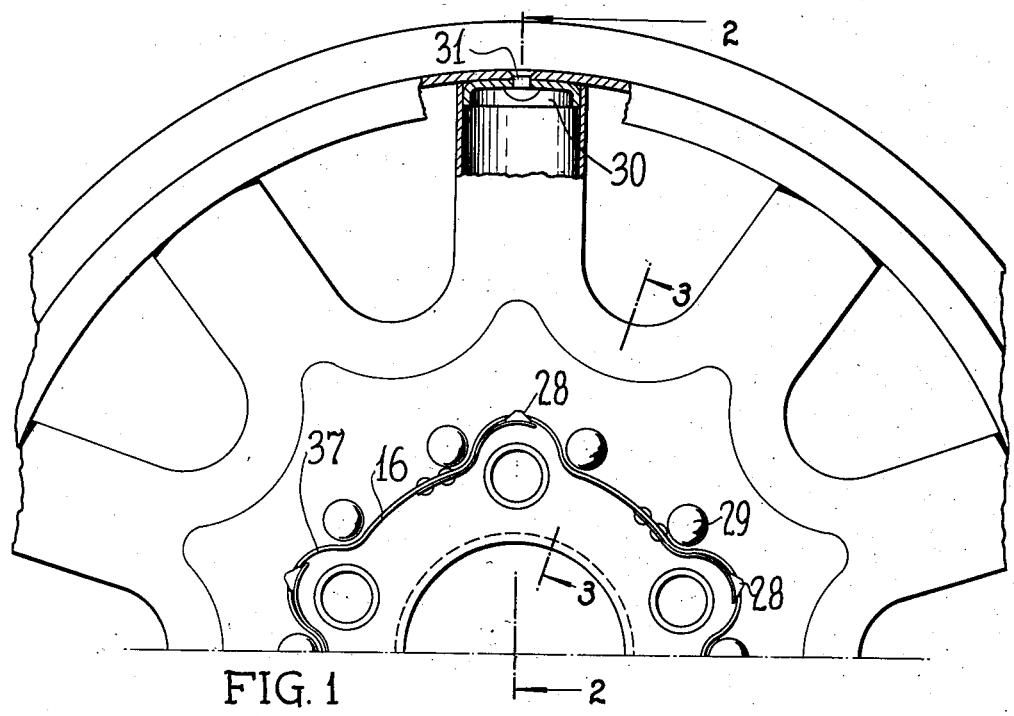
FIG. 1
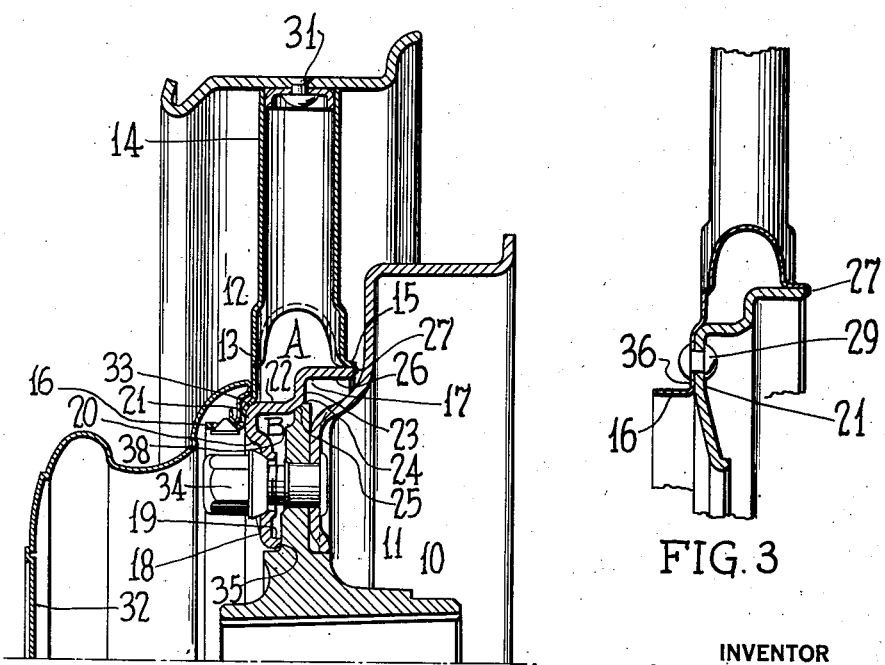
FIG. 2
FIG. 3
INVENTOR
CAROLUS L. EKSERGIAN
BY
ATTORNEY Patented June 7, 1938

2,119,669

UNITED STATES PATENT OFFICE 2,119,669

VEHICLE WHEEL

Carolus L. Eksergian, Detroit, Mich., assignor to Budd Wheel Company, Philadelphia, Pa., a corporation of Pennsylvania Application April 17, 1931, Serial No. 530,742

16 Claims. (Cl. 301—9)

My invention relates to the art of vehicle wheels and it has been my particular object to produce an artillery wheel of the steel type of sturdy construction which can be readily fabricated from a minimum amount of material by a simple series of forming and assembly operations.

A further object has been to provide a wheel of this type having an ornamental cover for concealing the cap nuts and other unsightly parts with a novel and simple arrangement for holding the cap nut concealing cover in place.

A still further object has been to produce a wheel of this type having an integral main body portion provided with fore-shortened nave secured to a mounting plate, in which the wheel is secured to the mounting plate and the mounting plate is in turn secured to the hub in a manner which insures a maximum of strength throughout the nave and mounting plate portions and a maximum of stability of the wheel at large An incidental object in connection with the mounting arrangement has been to stress the inner radial portions of the wheel in such a manner as to minimize weaving in the zone of the bolt circle and resiliently resist the loosening of the nuts, thereby producing a locking effect upon the nuts.

Another object has been to provide a mounting plate and hub combination in which the mounting construction may be used in connection with wheels of either the artillery steel or wire type. Another feature of the hub arrangement is the provision of a hub upon which wheels having other types of mounting than that here illustrated may be secured.

The manner in which I have attained these and other objects of my invention will be obvious from a reading of the subjoined specification in the light of the attached drawing, in which Fig. 1 is a side elevation of my improved wheel.

Fig. 2 is a section on the line 2—2 of Fig. 1, and

Fig. 3 is a section on the line 3—3 of Fig. 1 showing the wheel parts removed from the hub flange.

Referring to the drawing by reference characters, the numeral 10 indicates the hub of a vehicle having a radially outwardly extending annular flange 11 projecting therefrom intermediate the ends thereof. The main body of my improved wheel is designated 12 and consists of a foreshortened nave portion 13 and spoke portions 14 integrally joined together. These parts are preferably formed of complemental spider shaped stampings which are joined in a central radial plane to produce a unitary main body. It should be noted that the nave portion of the main body of the wheel is left entirely open at its inner radial extremity in the initial formation of this part of the wheel. The inner radial extremity of the inner face of the nave of the wheel is turned axially inwardly to form an annular flange 15. In a similar way the inner radial extremity of the outer face of the nave of the wheel is turned axially outwardly as indicated at 16. The purposes of these outwardly turned flanges will be explained hereinafter.

In connection with the main body of the wheel I provide a sheet metal mounting plate 17 which includes an inner radially extending portion 18 having an axially inturned flange 19 adjacent the inner radial extremity thereof adapted to abut against a portion of the hub flange when the wheel is secured in place. The radially extending portion 18 terminates in a diagonally outwardly extending portion 20 which merges into a radially turned portion 21 having a shouldered seat 33 adjacent its outer radial extremity against which a complementally shouldered portion of the outer face of the nave is adapted to seat. The mounting plate is turned axially inwardly at 22 beyond the shouldered portion 33 and merges into a radially outwardly extending flange 23 through a diagonally extending seat 24 which is adapted to be mounted upon a complemental seat upon the outer periphery of the hub flange to secure the wheel in place. The flange 23 terminates in an axially extending flange 26 which flares outwardly at a slight angle to the axis of the wheel. The relative proportions and angularity of the parts is such that the mounting plate and hub flange seat at 24 and the mounting plate may be forced to seat at the inner axial extremity of the flange 19, as indicated at 35, by tightening the securing means 34 after this initial seating has occurred. The mounting plate is thus secured to the hub flange in spring-fit relationship thereto.

The manner in which the mounting plate is secured to the main body of the wheel will next be described. These parts are first arranged in telescoping relationship with the flange 15 of the main body telescoping with the flange 26 of the mounting plate and the ends of these parts in substantial alignment. The flare of the flange 26 and the relative dimensions of the parts are proportioned in such a manner that they insure that the parts will be arranged in pressed-fit relationship when this alignment takes place. When the parts are arranged as above indicated, the shoulder upon the inner face of the nave will be seated upon the shoulder 33 of the mounting plate and a radially extending portion 36 of the outer face of the nave will abut flatwise against the radially extending portion 21 of the mounting plate. The arrangement of these parts at this stage is best illustrated in Fig. 3. After the parts are arranged as indicated, they are arc welded along the aligned edges of the flanges 15 and 26, as indicated at 27, to permanently secure these parts together. They are also riveted together as illustrated at 29 through their flatwise zone of engagement. The parts should be relatively proportioned in such a manner that a pressed-fit relationship will exist in the mounting of the nave portion of the main body upon the mounting plate at both sides of the wheel.

The flange 16 is of sinuous form, having outwardly extending curved portions 37 surrounding the bolt holes in the mounting plate in order to provide clearance for the wrench which engages the nuts 34 in the securement and removal of the wheel from the hub. The curved portions 37 preferably extend outwardly to an annular region of larger diameter than a circle circumscribing the outer edges of the rivets 29. A plurality of spring-pressed locking indents 28 project through the outermost portions of the flange 16 and coact with a flange upon a suitable hub cap 32 for concealing both the rivets and the bolts and nuts which secure the wheel in place upon the hub flange. Suitable end cap connections 30 are inserted through the open nave portion of the wheel before the assembly of the mounting plate therewith and riveted to the rim as indicated at 31, thereby securing a rigid connection between the rim and spoke body.

The flange 11 of my hub is peculiarly formed to provide a suitable mounting either for an artillery steel wheel of this type, or for a wheel which affords the more conventional Michelin mounting, as illustrated in the patent to Michelin 1,376,390. To this end my hub flange is of the conventional type in its radial regions extending outwardly as far as the zone 38 which is adapted to mount the more conventional Michelin type of wheel. It is rabbeted beyond this portion and this rabbeted portion terminates in the angular zone 24 which provides a seating for a wheel of the present type and thus makes provision for the mounting of wheels of either of these types upon the same hub flange.

The manner in which I have achieved the objects of my invention will now be apparent. In the first place it will be noted that the nave portion of the wheel together with the upper portion of the mounting plate affords a box section of very great strength as indicated at A. It will be also noted that the lower portion of the mounting plate together with the hub flange affords a second box section as indicated at B, which strengthens this part of the wheel. The mounting of the wheel on the diagonally extending seat 24 is substantially in line with the plane of tread, thus affording a direct radial imposition of stresses upon this seat. The spokes of the wheel thus constitute columns in the transmission of radial stresses direct to the diagonal seat upon the hub flange periphery. This also affords a superior balance for the wheel due to the fact that there is no overhang. The inwardly turned flange of the inner face of the nave tends to strengthen and stiffen the wheel at this point very considerably as it not only affords the reinforcement of a stiffening flange but also affords a double thickness of metal at this connection due to the telescoping arrangement of the flanges 15 and 26. This flange serves as a step for compression loading and the pressed-fit relationship of the parts tends to relieve the wheel of tensile stresses. It will be noted in this connection that the weld 27 is upon the rear side of the wheel where it does not detract from the appearance thereof. It will also be noted that the relative arrangement of the mounting plate and nave of the main body of the wheel are such as to facilitate the assembly of these parts.

The mounting of plate 24 before it abuts at 35 allows the nuts to spring the plate through a slight angle between the occurrence of these two impingements, thus tensioning the inner portion of the mounting plate and effecting a locking action with respect to the nuts 34. This tensioning also tends to eliminate weaving in the inner portion of the wheel. It will be noted that the radial load of the wheel is divided between the seats 33 and 15, the shouldered portion at 33 assisting strongly in the support of radial load. The flange 16 tends to stiffen the inner radial portion of the outer face of the nave and thus allows this portion to lie flatwise as indicated at 36 and facilitates the riveting operation. The stepped or Z shaped axial cross section of the mounting plate is of a large over-all advantage from several standpoints two of which are outstanding. The radial arm or web 23 of the cross section highly stiffens the mounting plate and the wheel in the plane of tread and against the radial load imposed through the seat 25. This assures a constancy of dimension at the seat 25 and is a safeguard against loosening. The general extension of the axial cross section is at an angle to the axis of the wheel, as it might be if it were generally coned. Indeed, the stepped axial cross section may be considered as a short frustrum of a cone. This has the high advantage of ease of assembly with the spoke body, by means of axial insertion and pressed fit and at the same time at once affords a seat intermediate the axial extremities of the cross section, clears over the extreme periphery of the hub flange, of both mounting plate and wheel body, enabling the seat 25 to reach to the plane of tread of the wheel, and a greater radial extent for the nave 13 presenting a more pleasing appearance, excellent foundation for the wheel body on the mounting plate both for the inside and the outside stampings of the wheel and easy radially inward extension of the mounting to include the bolt circle, and finally an extremely strong yet extremely simple and economically manufactured mounting plate, one which may be formed precisely to shape by a single die stamping operation.

Modifications will be obvious to those skilled in the art and I do not therefore wish to be limited except by the scope of my sub-joined claims as interpreted in the light of the generic spirit of my invention.

I claim:

1. An artillery steel wheel comprising, in combination, a main body consisting of integral spoke and nave portions having spaced apart side walls, and a mounting plate secured to the outer side wall in a radially extending contact, said outer side wall being turned axially outwardly adjacent its zone of securement to the mounting plate, said axially out-turned portion constituting a flange of sinuous form adapted to surround the securing bolts and mount a concealing plate which covers the securing bolts and the zone of securement of said outer side wall to the mounting plate.

2. An artillery wheel comprising a steel wheel body and a mounting plate secured to the nave portion thereof, said mounting plate including a stepped outer portion having an angular seat at the apex of the lower step, and a flange depending from the outer axial end of the lower step provided with openings to receive securing bolts.

3. A mounting plate for mounting wheels upon a hub flange comprising, a stepped outer portion presenting a seat intermediate successive steps thereof for impingement against a hub flange, and a radially extending portion inwardly of said stepped portion, said last named radially extending portion being provided with openings to receive securing bolts.

4. A hub for vehicle wheels comprising, a main body portion and an annular flange extending radially outwardly from said main body portion, said annular flange being provided with successive seats in its outer radial regions adapted to receive different types of wheel mountings.

5. A hub for vehicle wheels comprising, a main body portion and an annular flange extending radially outwardly from said main body portion, said annular flange being provided with successive seats in its outer radial regions adapted to receive different types of wheel mountings, said seats presenting in axial cross section an impingement point and an axially extending portion respectively.

6. A vehicle wheel including, in combination, a hub, a flange on said hub, an artillery wheel body including integral hollow spoke and foreshortened nave portions, and a mounting plate secured to an inner radial zone of the nave portion of the main body of the wheel and demountably secured to the hub flange, said mounting plate presenting an outer annular box section in combination with the nave of the wheel and an inner annular box section in combination with the hub structure.

7. A vehicle wheel including, in combination, a hub having a radially extending flange projecting therefrom, a steel wheel body including integral spoke and foreshortened nave portions, and a mounting plate supporting opposite sides of said hollow nave portion, said mounting plate seating upon the periphery of the hub flange in an annular zone intermediate the zones of support of said hollow nave portion.

8. An artillery steel wheel comprising a hollow main body of sheet metal having a nave portion provided inwardly with inside and outside shoulders of different radial distances from the axis of the wheel, a demounting plate having frustroconical principal cross section affording seating for said shoulders at its opposite extremities and provided with an annular mounting seat for the wheel upon a hub intermediate said extremities, and a radially inward extension from said mounting plate carrying bolt holes for securing the wheel in place.

9. A vehicle wheel including, in combination, a hub, a body of spokes, and a mounting plate secured to said body of spokes forming a box section of annular form, said mounting plate demountably secured to said hub flange, and forming together with said hub structure, a second box section of annular form.

10. A pressed metal artillery wheel comprising, in combination, a main body consisting of integral hollow spoke and nave portions having spaced apart side walls, the space between said walls opening radially inwardly, one of said side walls being turned axially away from the wheel plane at its inner radial extremity to form a flange, and the other being formed with an angular seat facing toward the wheel plane and radially inwardly, and a mounting plate telescoping with said flange and fitting into the angle formed by said seat and secured to said flange and adjacent said seat.

11. A pressed metal artillery wheel comprising, in combination, a main body consisting of integral hollow spoke and nave portions having spaced apart side walls, the space between said walls opening radially inwardly, one of said side walls being turned axially away from the wheel plane at its inner radial extremity to form a flange, and the other being formed with an angular seat facing toward the wheel plane and radially inwardly, and a mounting plate having radially and axially extending portions telescoped in pressed fit relationship within said flange and having the angular portion connecting the radial and axial portions nesting with said seat, the mounting plate being welded to said flange and secured through the radially extending overlapping portions of said seat and said mounting plate.

12. A pressed metal wheel comprising, in combination, a main body consisting of integral spoke and nave portions having spaced apart side walls providing a hollow nave portion opening radially inwardly, and a mounting plate secured to the hollow nave portion of the main body and closing the space between the side walls of said nave portion, the inner radial extremity of the outer side wall of said nave portion being turned axially outwardly and providing a seat for a cap nut concealing cover, said mounting plate extending radially into a mounting flange portion.

13. A pressed metal wheel comprising, in combination, a main body consisting of integral spoke and nave portions having spaced apart side walls providing a hollow nave portion opening radially inwardly, a mounting plate secured to the hollow nave portion of the main body and closing the space between the side walls of said nave portion, the inner radial extremity of the outer side wall of the wheel body being turned axially outwardly to provide a flange for a cap nut concealing cover, and the inner radial extremity of said mounting plate providing a radially extending bolting on flange portion.

14. A pressed metal wheel comprising, in combination, a main body consisting of integral spoke and nave portions having spaced apart side walls providing a hollow nave portion opening radially inwardly, said side walls terminating in oppositely outwardly axially extending flanges disposed in radially spaced zones, and a mounting plate having an angularly extending portion secured adjacent the side wall extremities of said hollow nave portion of the main body and closing the space between the side walls of said nave portion, the outer of said axially extending flanges providing a seat for a cap nut concealing cover, and said mounting plate including a radially extending bolting on flange portion.

15. A wheel assembly comprising an inner hub member having a radially disposed surface adjacent the axially outer end thereof and an axially disposed surface axially spaced from said radially disposed surface, a rim member encircling the inner hub, an outer hub member also encircling the inner hub, said outer hub member including a portion extending axially inwardly and having axially spaced portions one seated upon the inner hub member at said axially disposed surface thereof and the other extending to the axially outer side of said radially disposed surface of the inner hub and secured thereto, means connecting the rim to the outer hub including a wheel body member secured to said outer hub member and having an axially outwardly extending portion projecting beyond the inwardly extending portion of the outer hub member and adapted to detachably receive a hub cap, and means radially inwardly of said axially outwardly extending portion for securing the inwardly extending portion of the outer hub member to the inner hub member, the outer hub member combining with said wheel body member to produce an annular box section.

16. A wheel assembly comprising an inner hub member having a radially disposed surface adjacent the axially outer end thereof and an axially disposed surface axially spaced from said radially disposed surface, a rim member encircling the inner hub, an outer hub member also encircling the inner hub, said outer hub member including a portion extending axially inwardly and having axially spaced portions one seated upon the inner hub member at said axially disposed surface thereof and the other extending to the axially outer side of said radially disposed surface of the inner hub and secured thereto, means connecting the rim to the outer hub including a wheel body member secured to said outer hub member and having an axially outwardly extending portion projecting beyond the inwardly extending portion of the outer hub member and adapted to detachably receive a hub cap, and means radially inwardly of said axially outwardly extending portion for securing the inwardly extending portion of the outer hub member to the inner hub member, the outer hub member combining with said inner hub member and said wheel body member to produce concentric box sections.

CAROLUS L. EKSERGIAN.